Aug. 9, 1960 R. S. THATCHER 2,948,880
APPARATUS FOR PRODUCING SEISMIC RECORDS
Filed May 31, 1957 5 Sheets-Sheet 1
Fig. 1.
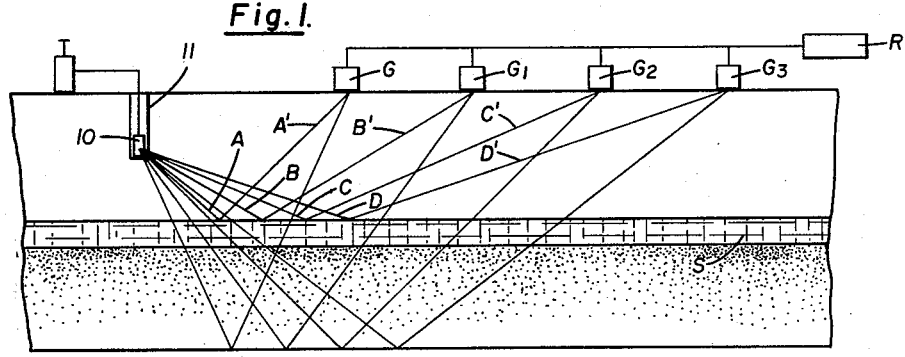
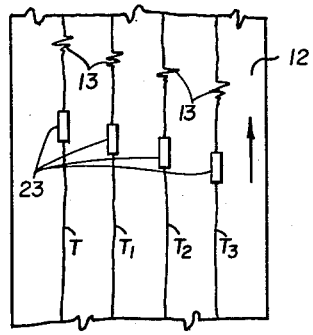
Fig 2.
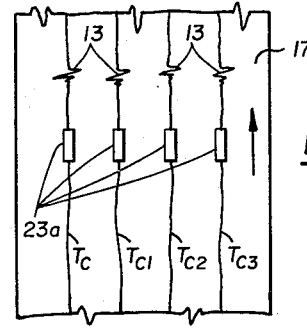
Fig 3.
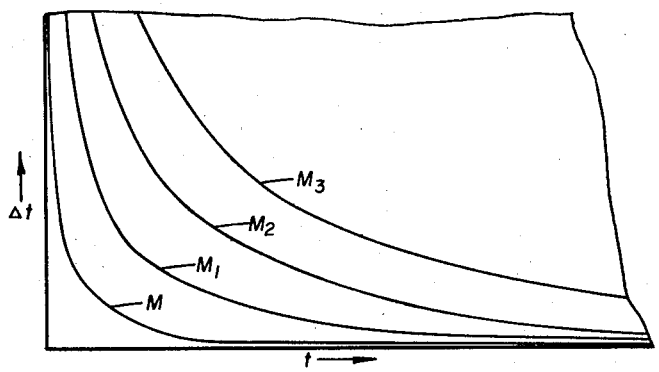
Fig 4.
Russell S. Thatcher
INVENTOR
BY Arnold and Stidham
ATTORNEY Aug. 9, 1960  R. S. THATCHER  2,948,880
APPARATUS FOR PRODUCING SEISMIC RECORDS
Filed May 31, 1957  5 Sheets-Sheet 2

Russell S. Thatcher II
INVENTOR.

BY Arnold and Stidham

ATTORNEY

Russell S. Thatcher
INVENTOR.

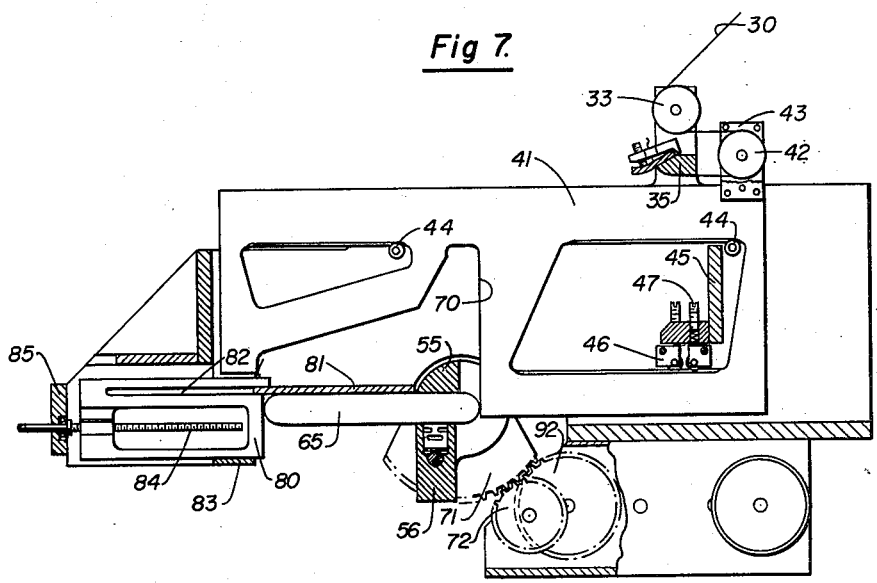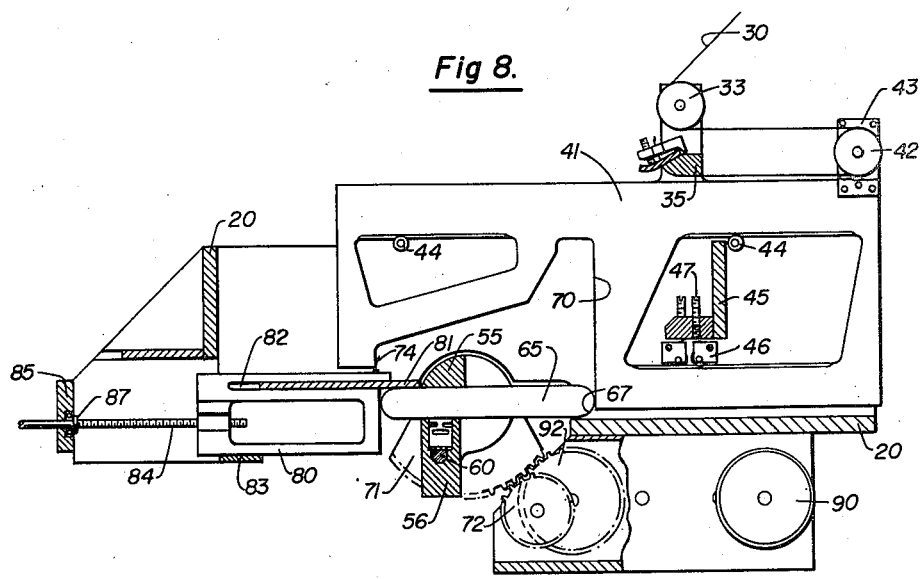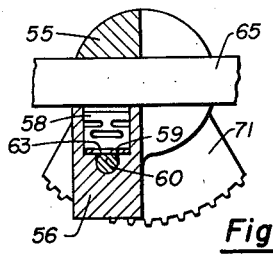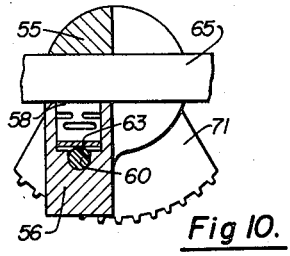

Aug. 9, 1960

R. S. THATCHER 2,948,880

APPARATUS FOR PRODUCING SEISMIC RECORDS

Filed May 31, 1957

Russell S. Thatcher
INVENTOR.

BY Arnold and Stidham

ATTORNEY

United States Patent Office 2,948,880
Patented Aug. 9, 1960

2,948,880
APPARATUS FOR PRODUCING SEISMIC RECORDS

Russell S. Thatcher, Houston, Tex., assignor, by mesne assignments, to Dresser Industries, Inc., Dallas, Tex., a corporation of Delaware Filed May 31, 1957, Ser. No. 662,881

9 Claims. (Cl. 340—15)

This invention relates to new and useful improvements in apparatus for producing seismic records and, more particularly, to apparatus for correcting moveout errors in such records.

In the seismic surveying field, seismic records are made by producing a shock at or near the surface of the earth to generate seismic waves, components of which radiate down through the earth's sub-surface formations to be reflected upward from sub-surface strata, and detecting and recording the time-of-arrival of such reflected components at the earth's surface by use of geophones. Preferably, there are employed a plurality of geophones located at receiving points spaced along the earth's surface at varying distances from the point of shock origin. The geophones translate the arrival of a reflected seismic wave component into an impulse which is transmitted to a recording medium to produce a sharp excursion or "kick" in the trace on the seismic record. Since the trace is continuously recorded at constant speed from the instant of shock, the length of the trace to the "kick" therein transmitted by the geophone is a direct reflection of time-of-travel. Because all of the receivers are not equidistant from the point of shock origin, they do not receive the appropriate reflected seismic wave components at the same instant of time. The resultant misalignment in the excursions or "kicks" of one trace relative to the "kicks" of adjacent traces caused by the difference in spacing of the geophones from the point of shock origin, is generally referred to as "move-out" or "step-out" error in the final seismic record. This move-out error may be determined if the velocity of sound through the sub-surface formation and the distance between the point of shock origin and each geophone are known. Of course, distance may be measured and, if the geologist is familiar with the sub-surface formations under investigation, the velocity of sound therethrough may also be determined. Correction for move-out error has been made manually by replotting the seismic records obtained in the field, but obviously such method is time-consuming and costly and is also subject to human error in the interpretation and replotting of the field record.

It is, therefore, an object of this invention to provide an apparatus to correct automatically move-out errors in seismic records.

It is a further object of this invention to provide an apparatus having a master control element representative of normal velocity curves, together with a plurality of modifying means to modify said normal velocity curve by introducing move-out corrections.

It is a further object of my invention to provide an apparatus operative to introduce automatically modifying corrections for move-outs during recording of a seismic record.

It is a further object of my invention to provide an apparatus which is reliable and simple in operation and which is economical to manufacture.

It is a further object of my invention to provide an apparatus adaptable to reproduce accurately seismic field records while correcting automatically the "move-out" error present in such records, whereby final seismic maps or layouts may be rapidly and expeditiously made without the necessity of interpreting and replotting the field records, as is now the general practice.

The present invention relates to an apparatus for producing a final seismic record by varying automatically the alignment of the recording or play-back elements relative to the traces of an uncorrected record. Such elements are initially disposed in misalignment corresponding to the calculated initial misalignment due to move-out of the traces on an uncorrected sesmic record. Since the move-out errors decrease with recording time as the depths of the strata reflected by subsequent events approach infinity, this compensating misalignment of the recording elements must likewise be decreased as the record progresses. To accomplish this I mount the recording elements for movement along the surface of the record, each of said elements being governed by separate cam means which effect a longitudinal displacement of the element along the record. Although the series of elements move as a unit in accordance with normal velocity curves, the elements must also be controlled individually to decrease gradually the misalignment thereof until all are in line at a point along the record representative of infinite depth.

The invention will be more readily understood from a reading of the following specification and by reference to the accompanying drawings forming a part thereof, wherein an example of the invention is shown and wherein:

Fig. 1 is a schematic diagram illustrating the manner in which a seismic field record is made and showing the receiver geophones spaced at varying distances from the detonated charge;

Fig. 2 is a partial view of a field seismic record illustrating the move-out errors in the original traces;

Fig. 3 is a partial view of a corrected seismic record;

Fig. 4 is a graphical illustration of move-out curves;

Fig. 7 is a diagrammatic elevation in section of a portion of such apparatus showing a cam slide in neutral position;

Fig. 8 is a similar view showing a cam slide in active position;

Figs. 9 and 10 are partial section views showing the cam slide mounting means;

Figure 5:
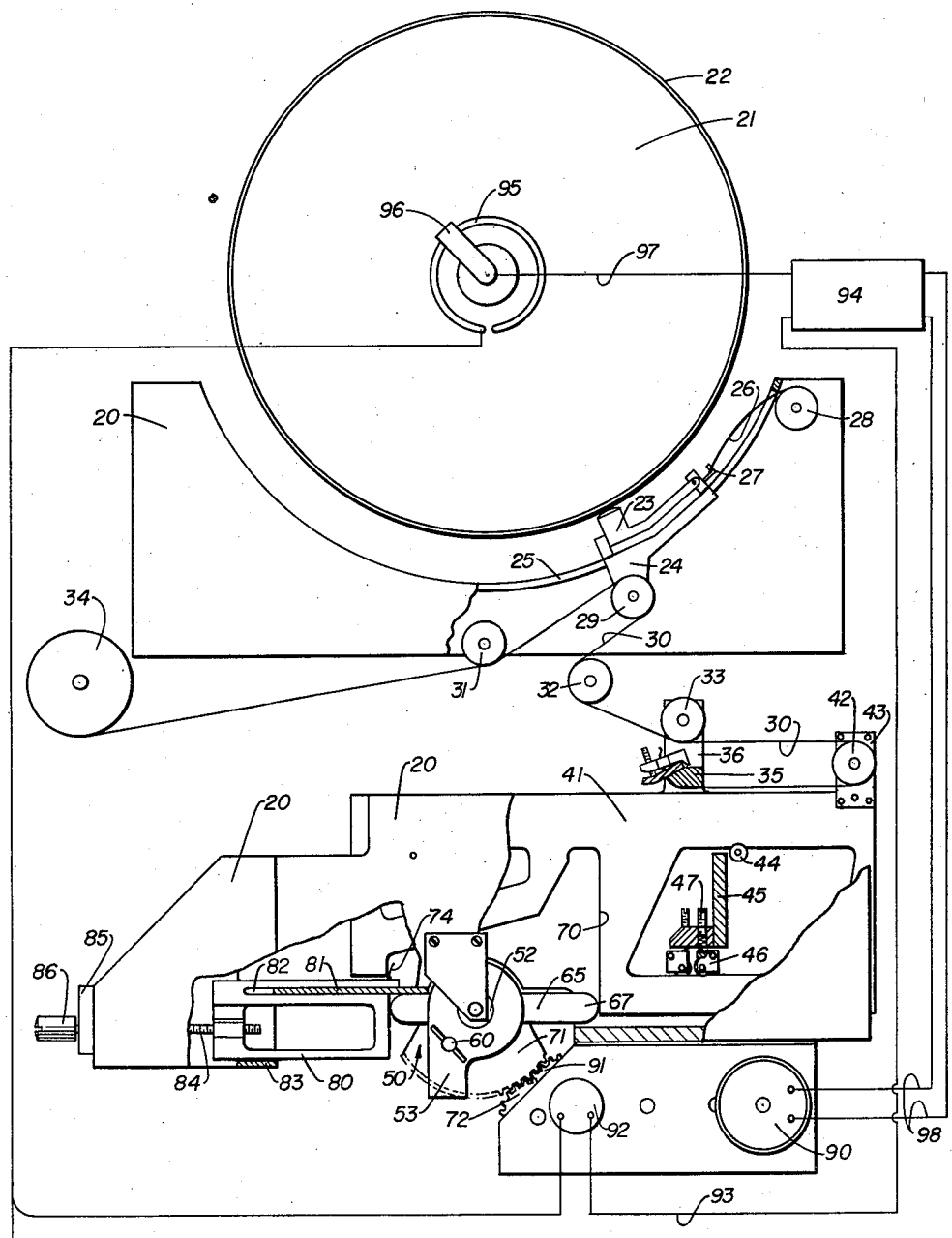
Fig. 5 is a diagrammatic elevation in partial section of apparatus constructed in accordance with the invention.

Referring to Fig. 1, which is a schematic diagram illustrating the usual seismic survey method, a suitable charge or shot 10 is detonated within a shothole 11 and the detonation of such charge or shot generates seismic waves which traverse the sub-surface formations. A seismic wave A travels downwardly from the shot or charge and is reflected back upwardly from the upper surface of a stratum S, the reflected wave being indicated by A'. A geophone receiver G receives the reflected wave and at the instant of reception generates an energy impulse which results in an amplitude change in the trace which is recorded on the seismic record by the recorder R, this amplitude change being visibly recorded in the form of a "kick" or excursion in the trace line. Similarly, a wave B is reflected as indicated by B' and is received by geophone G'; waves, C, C' and D, D' are similarly received by geophones $G^2$ and $G^3$. It is noted that the geophones are spaced at different points from the shot-hole 11. Therefore, assuming the same velocity for all wave components, the time between detonation of the charge and the reception by the geophones will likewise differ.

In the graph of Fig. 4, a series of move-out curves M to $M^3$ are plotted to depict the effect of move-out on the accuracy of seismic records. Each curve indicates the time error $\Delta t$ at any given time $t$ caused by the spacing of the geophone from the shot point. Curve M represents minimum move-out. Each of the curves illustrates a substantial time difference or move-out error in the early time periods of the record. Obviously at shallow depths move-out is more significant because the angle between the generated and the reflected waves is greater. As greater depths are reached, reflected by the passage of time, the angle becomes smaller and the error due to move-out falls off, first sharply and then gradually as greater depths are reached and the increase in time $\Delta t$ due to move-out becomes negligible. Curves $M^1$ to $M^3$ are similar but successively reflect a greater move-out error at any instant due to increased move-out.

The method illustrated in Fig. 1 is standard practice and the particular field seismic record which is produced is partially illustrated in Fig. 2. The record is usually in the form of a tape 12 having traces T, $T^1$, $T^2$ and $T^3$ thereon. Geophone G controls the "kicks" or excursions 13 which are formed in the trace T and which indicate the instant of reception of a reflected wave. Similarly, geophones $G^1$ to $G^3$ control the formation of the "kicks" or excursions 13 in traces $T^1$ to $T^3$, respectively as shown in Fig. 1, stratum S has its upper surface extending in substantially a horizontal plane and therefore if all of the reflected waves were received at the same instant the "kicks" or excursions 13 in traces T to $T^3$ would be a line perpendicular to the longitudinal axis of the tape to indicate that the upper stratum S is, in fact, in a horizontal plane. As is clearly shown in Fig. 2, the "kicks" or excursions in traces T to $T^3$ which are representative of the upper surface of stratum S, are not transversely aligned with respect to the trace 12, this misalignment being caused by the time delay factor in the reception of reflected waves; thus, the "kicks" or excursions 13 appearing on the traces are not an accurate indication of the upper level of the sub-stratum S. The present invention relates to apparatus applicable to correct automatically for the move-out error so that the seismic record produced will reflect an accurate representation of the sub-surface strata.

Referring now to Figs. 5 to 13 wherein the apparatus comprising the present invention is generally illustrated, said apparatus includes a rigid frame structure 20 partially shown by diagrammatic representation. Rotatably mounted on the frame is a drum 21 on which the seismic field record 22 is carried. Disposed adjacent to the periphery of drum 21 is a transverse array of movable heads 23, each of which is adapted to "read" or to reproduce the traces impressed on seismic record 22 as it is moved by. Preferably magnetic tapes are employed as the recording medium in which case the heads 23 may be magnetic readers or pickup heads adapted to play back and transmit the magnetic impressions on record to a second aligned array of recording heads 23a which impress a corrected reproduction of traces T to $T^3$ as traces TC to $TC^3$ on a separate recording medium as shown generally in Figs. 2 and 3.

Each head 23 is mounted on a carriage 24 which traverses, in sliding or rolling contact, arcuate slideway 25 supported on the frame 20 of the machine. The bearing surface of slideway 25 is concentric to the periphery of drum 21 so that, throughout its movement, each recording head 23 is in operative position relative to the seismic record 22. A coil spring 26 is secured at 27 to the carriage 24 and at 28 to the frame 20 in order to maintain a constant force on carriage 24 biasing it in the direction in which the drum 21 rotates (counterclockwise in Fig. 6). Rotatably mounted on each carriage 24 is a sheave 29 which rides on a cable 30 threaded over pulleys 31, 32 and 33 rotatably carried on the frame 20. One end of each cable 30 is anchored to the frame of the machine on fixed spindle 34 and the other end of each cable is anchored to the frame by means of a clamp 35, carried on bracket 36 on which is rotatably mounted guide pulley 33. Spindle 34 may be turned to make initial adjustments of the cable but for purposes hereof may be considered a fixed anchor point. It is apparent from Fig. 5 that if tension were applied to a cable 30, the carriage sheave 29 would be pulled toward guide pulleys 31 and 32 to produce a clockwise movement of the appropriate playback head 23. The function of the movable playback heads is illustrated graphically in Fig. 2 wherein playback heads 23 reading traces $T^1$ to $T^3$, respectively are advanced relative to the head 23 reading trace T by an amount equal to the displacement of their respective excursions 13 so that as field record 12 is moved past the heads 23 by rotation of drum 21, all excursions would be "read" at the same instant and transmitted to an aligned bank of recorders 23a which impress the signals TC on the final record 17 with the excursions 13 aligned.

While I have described the heads 23 as being of the magnetic playback type, my invention should not be so limited. The aforedescribed adjustment of the head alignment could be applied to recording heads so that, if incorporated into the field recorder, move-out compensations would be applied to the original field record. However, I have found that the method wherein the field record with move-out errors is read by reproducing heads so adjusted to transmit the reproduced traces to a series of aligned heads produces greater accuracy with less complex apparatus.

If the move-out correction were made by adjusting the alignment of recording heads, as opposed to playback heads, which record signals received from the geophones or from a direct transcription of previous records, the positions of the recording heads must likewise be staggered in accordance with the calculated move-out error as seismic wave components are received. However, as the time of seismic wave travel increases toward a depth of infinity, the move-out error decreases. Consequently, the recording heads must gradually be brought back into alignment as recording progresses. I have found that I can reduce the complexity of apparatus capable of accomplishing this by moving the entire bank of recorders or readers as a unit and modifying the movement of each to produce the eventual realignment. In recording, there is a time elapse between reception of the first and last signals of each series of seismic wave components. Obviously, if the entire bank of recorders is adapted to move as a unit, they cannot initially be staggered in accordance with calculated move-out error because heads recording later events of a series will have moved during the time elapse from their adjusted position. Consequently an additional factor is introduced and must be compensated for. Frequently mechanical limitations of apparatus employed render such compensation impracticable.

On the other hand, if movable reproducing heads are used to read traces with move-out error a particular event on one trace will be picked up at the same instant corresponding events are detected by all other heads. There is no time lag and, hence, all heads may be moved continuously and simultaneously toward gradual realignment to adjustment for subsequent events.

Referring again to the drawings, I have disclosed a preferred form of apparatus for accomplishing the desired simultaneous movement at varying velocities of all recorder heads 23. Longitudinally slidable in slideways provided therefor in frame 20 is a plurality of cable pulling slides 41, one for each head 23. A pulley 42 is rotatably mounted on a bracket 43 secured to each slide 41 whereby movement of a slide 41 to the right in Fig. 6 will be transmitted through cable 30 to pull the appropriate head 23 in a clockwise direction against the action of spring 26.

Movement of slides 41 is facilitated by rollers 44 carried on the frame 20 of the machine. A bracket 45, also secured to the frame 20, carries spring urged bearings 46 which bear on each slide under a force regulated by adjustment screws 47 to maintain the slide in rolling contact with rollers 44.

Figure 6:
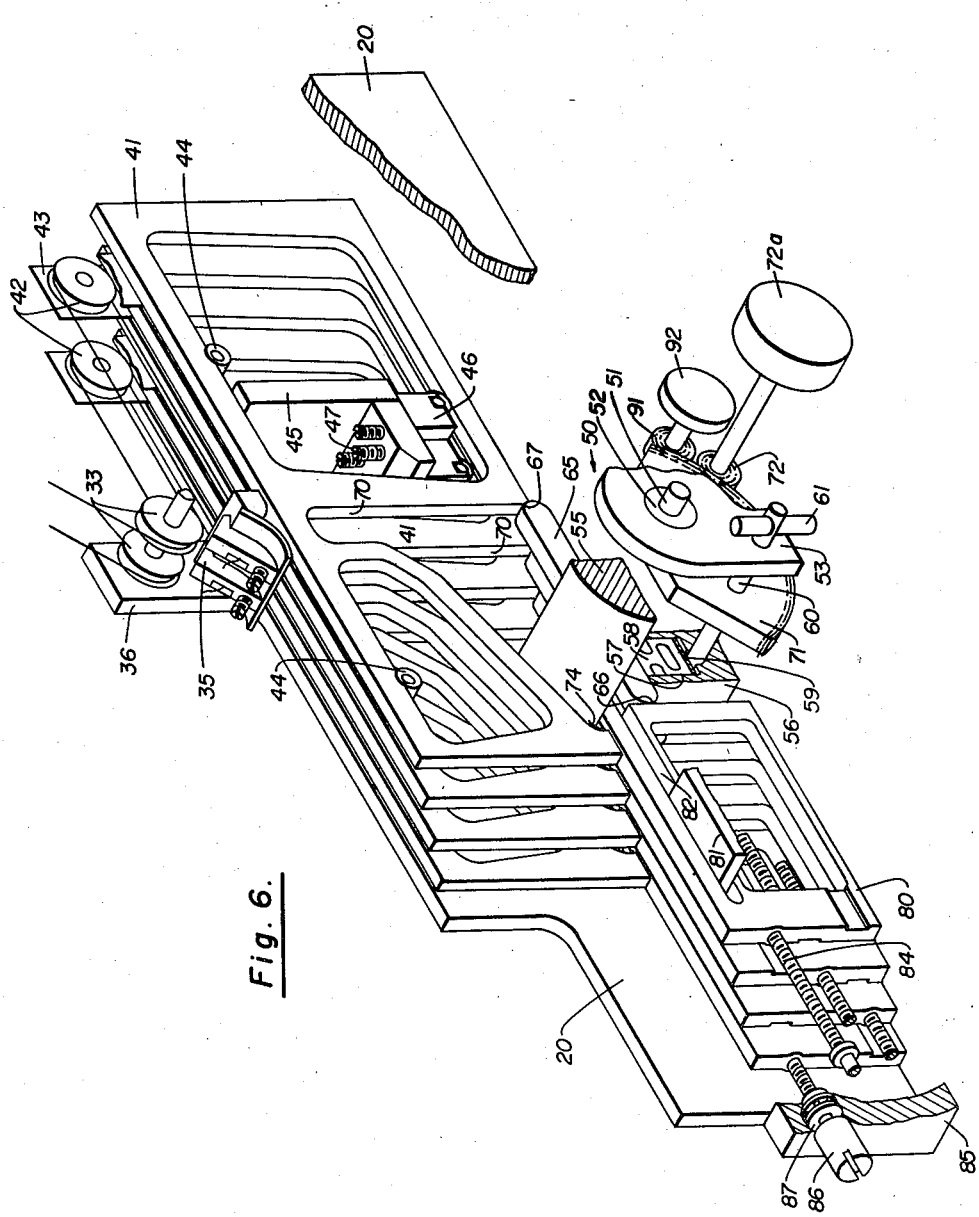
Fig. 6 is an isometric view in partial section of apparatus constructed in accordance with the invention.
Figure 11:
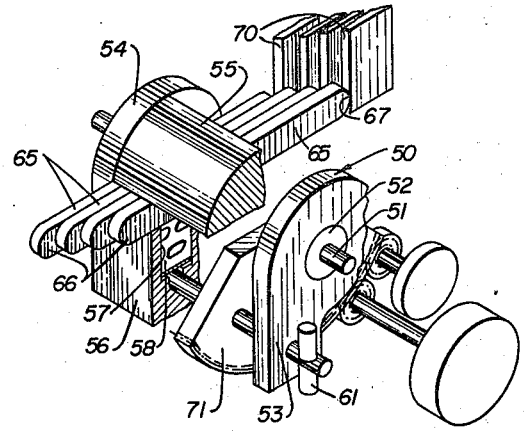
Figs. 11 and 12 are isometric diagrammatic views in partial section showing the rotatable cam slide carrier at opposite limits of its partial rotation.
Figure 12:
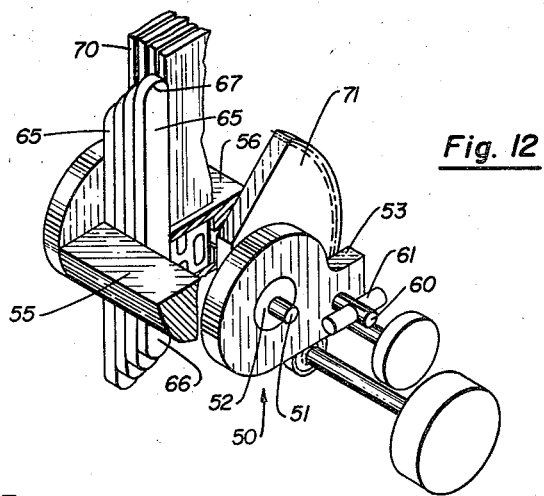
Figure 13:
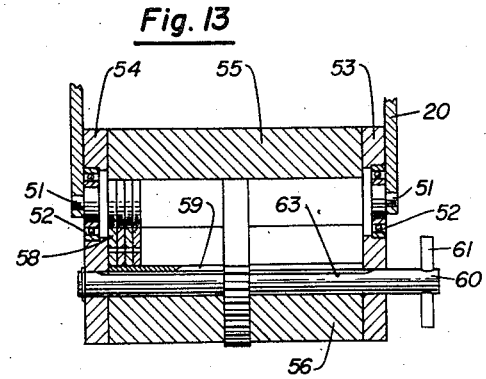
Fig. 13 is a view in section of the rotatable cam slide carrier.

By moving a slide 41 to the left in Fig. 6, the reproducing head 23 is moved in a direction opposing spring 26 opposite to the direction of rotation of field record 22 on drum 21, and therefore advanced relative thereto, so that events normally detected at a specific radial disposition of drum 21 are detected somewhat earlier. Thus, by advancing the various reproducing heads 23 different amounts so that the head "reading" the trace detected by the geophone at the greatest move-out is advanced the greatest circumferential distance along the periphery of drum 21 with the other heads being advanced a proportionately less amount, as shown in Fig. 3, the move-out error in the traces can be nullified and a series of signals sent by reproducing heads 23 to a straight bank of recording heads 23a to produce corrected seismic record.

Rotatably carried on frame 20 is a master cam slide control unit 50 (Figs. 11–13) having opposing coaxial stub shafts 51 rotatable on anti-friction bearings 52 in end plates 53 and 54. Secured between end plates 53 and 54 are an upper segmental clamping bar 55 and a lower clamp carrier 56. Within a longitudinal groove 57 in clamp carrier 56 is a plurality of powerful spring elements 58. An actuator plate 59 underlies the spring elements 58 and when forced upwardly compresses them to exert a substantial force in the direction of upper clamp bar 55. Referring to Figs. 9 and 10, upward movement of the actuator plate 59 is provided by a cam rod 60 extending entirely through clamp carrier 56 below actuator plate 59. When the cam rod 60 is turned by hand lever 61 until a flat portion 63 thereon is against actuator plate 59 the spring elements 58 will be relaxed. Rotation of cam rod 60 sufficient to turn the flat surface away from actuator bar will compress the spring elements 58.

Slidably carried between upper clamp bar 55 and clamp carrier 56 is a plurality of cam slide bars or arms 65 rounded at opposite ends 66 and 67. As appears elsewhere herein, a portion of the end 67 of each cam 65 constitutes the active cam bearing surface, and that operating surface is preferably of circular arc form, and not of the form of any compound or complex curve. With the spring elements 58 relaxed, slides 65 may be adjusted radially relative to the axis of rotation of control unit 50 represented by stub shafts 51. Each cam slide bar 65 may be so adjusted independently and then cam rod 60 turned to lock them against clamp bar 55 by means of spring elements 58. The forward end 67 of each cam bar 65 is adapted to engage a vertical cam follower surface or edge 70 on one of the motion transmitting slides 41. Thus, a cam bar 65 may be moved to the right in Fig. 5 to push the corresponding slide 41 therewith to a desired initial setting. When each cam bar 65 is so adjusted, the cam rod 60 is turned to force actuator plate 59 upwardly whereby the springs 58 will hold each cam slide 65 and, hence, each motion transmitting slide 41, in its set position.

It is apparent from the foregoing description and further explanation following, that each of the cam arms 65 has in operation an effective longitudinal reach from the axle 51 to the bearing surface at the end 67 thereof; and variation in this reach as between different cams enables the device in operation to correct each trace in different quantity though on the same basic curve as the other traces.

Also fixed to upper and lower clamp bars 55 and 56 at one end thereof is a segmented gear 71 adapted to be driven by a pinion 72 to rotate the entire assembly 50 about stub shafts 51. Obviously, because gear 71 is segmented, the assembly will not go through a complete revolution but will be limited in accordance with the design of the gear. I prefer that the control assembly 50 with cam bars 65 rotate through an arc of 90°. Thus, as the assembly rotates through 90° the cam slides 65 will pivot away from vertical cam follower surface 70 to permit each motion transmitting slides 41 to move to the left in Fig. 5 under the force of its spring 26 asserted against reproducing head 23. The cam slides 65 are arranged initially so that the slide 41 controlling the reproducing head 23 adapted to read the trace representing the seismic wave component at maximum move-out has the greatest displacement. However, as cam slides 65 rotate counter-clockwise through 90° all cam surfaces 67 will approach alignment until the effective points thereon that engage cam follower surfaces 70, are in a common vertical plane. Obviously all cam bars 65 pivot from their initial horizontal position to vertical disposition with the partial rotation of master control assembly 50, during the same period of time. Therefore, since their effective surfaces 67 are initially disposed out of alignment whereby motion transmitting slides 41 have different distances to travel, this rotation will produce simultaneous movement of motion transmitting slide 41 at different velocities. Of course, if a cam slide 65 is disposed originally with the center of semi-circular cam surface 67 on the axis of rotation represented by stub shaft 51, as in Fig. 7, rotation thereof will produce no movement of its associated slide 37. While the movement of motion transmitting slides 41 to the left into alignment is produced by coil springs 26 on their associated head sub-carriages 24, this movement is assisted initially by leaf springs 74 bearing against each slide 41. Leaf springs 74 assist in maintaining initial positive contact of slides 41 with cam bars 65 and assist in overcoming inertia to maintain cam follower surfaces 70 in engagement with cam bars 65.

The initial settings of cam slides 65 are accomplished by means of positioning slides 80 which engage the trailing ends 66 of cam slides 65 to push them into engagement with motion transmitting slides 41. Positioning slides 80 are slidable on an upper plate guide 81 receivable in accommodating slots 82 in each slide 80 and also supported on plate 83, both guide plates 81 and 83 being supported on the frame 20. Upper guide plate 81 overlies the cam slides 65 to define the initial horizontal position thereof. Longitudinal movement of each positioning slide is controlled individually by a screw 84 threaded therein to displace it relative to an end wall 85 of the frame. An adjusting knob 86 is carried at the end of each screw 84 to produce rotation thereof. Preferably appropriate thrust bearings 87 are interposed between screw 84 and end wall 85 on the frame 20.

Rotation of master control assembly 50 through the desired 90° is accomplished by servo-motor 90 which, by suitable means rotates pinion 72 to drive segmental gear 71. A second gear 91 is driven by segmental gear 71 to produce rotation of a potentiometer 92 which is illustrated generally. Potentiometer 92 is designed to produce a decreasing voltage through conductor 93 and amplifier 94 to motor 90 as control assembly 50 pivots the cam slide bars 65 from their horizontal position at one extremity of the preferred one-quarter turn to their vertical positions at the other extremity of the preferred one-quarter turn. Of course, the arcuate movement of the cam surfaces 67 does not produce an equal linear movement of slides 41 since their paths of the motions movement follow generally a quarter-sine curve. Consequently, each succeeding degree of revolution tends to produce a greater increment of horizontal movement of slides 41. To compensate for this, the potentiometer is designed to produce a gradually decreasing voltage to motor 90 so that the rate of rotation of cam unit 50 is gradually decreased so that there is an equal increment of movement of a slide 41 during every increment of time.

As has been discussed, the amount of move-out error is greatest at the earlier periods of time representing the shallower depths and the error decreases sharply during the early recording periods and then gradually as time representative of infinite depths is approached. To compensate for this, I provide for advancement of all reproducing heads not as a straight line function of time, but in accordance with average move-out curves, of the type illustrated in Fig. 4, for the sub-surface being studied. Thus, if the control assembly 50 is rotated initially at a rapid rate and then slowed as its rotation progresses all reproducing heads 23 can be retracted from their advanced positions in accordance with the average move-out curve with the different initial advancement of cam slides 65, compensating for the variations from the average curve due to variations in geophone spacing. To accomplish this, I have provided a second potentiometer 95 carried on drum 21 and adapted to produce a gradually decreasing voltage decreasing in accordance with the average move-out curve as drum 21 rotates from the beginning to the end of the seismic record. Thus, a gradually decreasing voltage from potentiometer 95 is delivered through contact 96, conductor 97 and amplifier 94 to the servo-motor 90. Since, at the same time a gradually decreasing voltage is being fed from potentiometer 92, the sum, or difference, of the two voltages delivered through conductors 98 to the motor 90 gradually reduce the rate of rotation of master control assembly 50 as time measured by degrees of rotation of drum 21, progresses and further to compensate for the gradual increase in linear increments produced by subsequent rotary increments the cam bars 65.

In operation of my apparatus, a seismic field record is positioned on drum 21 with the beginning of the traces aligned with the normal, unadjusted position of reproducing heads 23. Each head 23 is then adjusted a calculated amount in accordance with the move-out of the trace to be "read" thereby. That is, the trace representing the greatest move-out is compensated by initially adjusting the head "reading" it a maximum measured amount. This is accomplished by positioning the appropriate positioning slides 80 to set the cam slides 65 and hence the motion transmitting slides 41. Traces representing no move-out or minimum move-out may be selected as the index and, therefore, the motion transmitting slide 41 for the appropriate reading head 23 need not be adjusted at all. Adjusting knobs 86 are calibrated to produce a predetermined movement of adjusting slides 80 dependent on the actual move-out from the shot point. Consequently, the correct initial compensation for each of the recorder heads 23 is produced automatically. All of the cam slides 65 operate on all of the following slides 41 to produce a similar and proportionate movement of each playback head 23. The decreasing potentiometer 95 produces a gradually decreasing rate of rotation of master control assembly in a predetermined pattern in accordance with the average move-out curve shown in Fig. 4. Hence, the greatest compensating effect of cams 65 is produced at the earliest portion of its quarter-turn revolution to conform with the gradually decreasing degree of move-out error with increased depth. Potentiometer 92 delivers a gradually decreasing voltage to motor 90 in order to compensate for the gradually increasing horizontal increment of movement effected by cams 65. As the cam slides 65 rotate through 90°, the follower slides 41 are urged to the left in Fig. 4 by the cable 30 under constant spring pressure 26 to permit the reproducing heads 23 to move in the direction of rotation of drum 21 and reduce gradually the compensating misalignment thereof.

The foregoing disclosure and description of the invention is illustrative and explanatory thereof, and various changes in the size, shape and materials, as well as in the details of the illustrated construction may be made within the scope of the appended claims without departing from the spirit of the invention.

Having described my invention, I claim:

1. Apparatus for producing a predetermined movement of a first member relative to a second member comprising driving means operative to move said second member past said first member in one direction at a constant velocity, biasing means urging said first member in said one direction, a slide member, a tension member interconnecting said slide member and said first member, said slide member being movable in an advancing direction to pull said tension member and said first member in opposition to said biasing means and in a retracting direction to slacken said tension member, a rotatable cam carrier, an elongate cam member longitudinally slidable in said carrier in the path of movement of said slide member, setting means for moving said cam member on said cam carrier to bring one end thereof into engagement with said slide member to move said slide member a predetermined amount in said advancing direction, means for locking said cam member on said carrier, and means for rotating said cam carrier to pivot said cam member in the plane of said slide member.

2. Apparatus for producing a predetermined movement of a first member relative to a second member comprising driving means operative to move said second member past said first member in one direction at a constant velocity, biasing means urging said first member in said one direction, a slide member, a tension member interconnecting said slide member and said first member, said slide member being movable in an advancing direction to pull said tension member and said first member in opposition to said biasing means and in a retracting direction to slacken said tension member, a cam follower surface on said slide member in the plane of movement of said slide member and transverse to the direction thereof, an elongate cam member in said plane of movement and having its axis along said direction of movement, said cam member having one end thereof in engagement with said cam follower surface, setting means operative to advance said cam member along said direction of movement a predetermined amount, means for locking said cam against further advancement, and means for pivoting said cam member about a point along said axis.

3. Apparatus for producing a predetermined movement of a first member relative to a second member comprising driving means operative to move said second member past said first member in one direction at a constant velocity, biasing means urging said first member in said one direction, a slide member, a tension member interconnecting said slide member and said first member, said slide member being movable in an advancing direction to pull said tension member and said first member in opposition to said biasing means and in a retracting direction to slacken said tension member, a cam carrier mounted for rotation on an axis perpendicular to the path of movement of said slide member, an elongate cam slide longitudinally slidable in said carrier in the plane of said slide member, one end of said cam slide engaging said cam member, said cam member being normally movable along the path of movement of said slide member to move said slide member a predetermined amount in said advancing direction, and actuating means for imparting a partial rotation to said cam carrier.

4. The apparatus defined in claim 3 wherein said actuating means impart a partial rotation to said cam carrier at a progressively decreasing rate of velocity.

5. Apparatus for producing a predetermined movement of a slide member comprising an elongate cam member disposed along the path of movement of said slide member, a surface on said slide member perpendicular to the longitudinal axis of said cam member when said cam member is in its normal position, biasing means urging said slide member toward said cam member with said surface engaging one end of said cam member, driving means for pivoting said cam member about said axis in the plane of movement of said slide member, and means for reducing the speed of said driving means as said cam member pivots from its normal position to a position parallel to said surface.

6. Apparatus for producing predetermined movements of a series of first members relative to a second member comprising biasing means urging each of said first members on one direction, a series of slide members, a tension member connecting each of said slide members to one of said first members, said slide members being movable along parallel paths in an advancing direction to pull the tension member and first member connected thereto in opposition to said biasing means and in a retracting direction to slacken said tension member, a cam carrier mounted for rotation in an axis perpendicular to the planes of movement of said slide members, a series of elongate cam members on said carrier, one end of each of said cam members engaging one of said slide members, each of said cam members being normally slidable on said carrier to move a slide member a predetermined amount in said advancing direction, means for locking said cam members in adjusted position on said carrier, and actuating means for imparting a partial rotation to said cam carrier.

7. The apparatus defined in claim 6 wherein said actuating means impart a partial rotation to said cam carrier at a progressively decreasing rate of velocity.

8. Apparatus for producing a corrected seismic record from a field record on which traces elongated by move-out error have been impressed comprising, a series of reading members, feeding means for moving said field record past said reading members in one longitudinal direction at a constant velocity, each reading member being operative to transmit a reproduction of one of said traces to a recording member, biasing means urging each of said reading members in said one direction, a series of slide members, a tension member connecting each of said slide members with one of said reading members, said slide members being movable along parallel paths in an advancing direction to pull the tension member and first member connected thereto in opposition to said biasing means and in a retracting direction to slacken said tension member, a cam carrier mounted for rotation in an axis perpendicular to the planes of movement of said slide members, a series of elongate cam members on said carrier, one end of each of said cam members engaging one of said slide members, each of said cam members being normally slidable on said carrier to move a slide member a predetermined amount in said advancing direction, means for locking said cam members in adjusted position on said carrier, and actuating means for imparting a partial rotation to said cam carrier during operation of said feeding means.

9. Apparatus for producing a predetermined movement of a slide member comprising an elongate cam member having a bearing surface, said cam member being disposed along the path of movement of said slide member and mounted for rotation through one-quarter turn in the plane of movement of said slide member and about an axis perpendicular to such plane; a follower surface on said slide member perpendicular to the longitudinal reach of said cam member from its axis of rotation to its bearing surface when said cam member is at one extremity of said one-quarter turn and parallel to said longitudinal reach when said cam member is at the other extremity of said one-quarter turn; biasing means urging said slide member and said cam member one to the other with said follower surface engaging said bearing surface; driving means for pivoting said cam member about said axis through at least substantially one-quarter turn; and means for varying the speed of said driving means in a predetermined pattern during said one-quarter turn.

References Cited in the file of this patent

UNITED STATES PATENTS

| | | |
|---|---|---|
| 2,243,730 | Ellis | May 27, 1941 |
| 2,440,971 | Palmer | May 4, 1948 |
| 2,604,955 | Hawkins | July 29, 1952 |
| 2,765,455 | Meiners | Oct. 2, 1956 |
| 2,800,639 | Lee | July 23, 1957 |
| 2,825,885 | Reynolds | Mar. 4, 1958 |
| 2,876,428 | Skelton | Mar. 3, 1959 |
| 2,877,080 | Eisler | Mar. 10, 1959 |